US006506461B2

(12) United States Patent
Affinito

(10) Patent No.: US 6,506,461 B2
(45) Date of Patent: Jan. 14, 2003

(54) METHODS FOR MAKING POLYURETHANES AS THIN FILMS

(75) Inventor: John D. Affinito, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/283,076

(22) Filed: Mar. 31, 1999

(65) Prior Publication Data

US 2001/0048978 A1 Dec. 6, 2001

(51) Int. Cl.⁷ ............................................. C23C 16/448
(52) U.S. Cl. ..................... 427/535; 427/551; 427/558; 427/559; 427/255.6; 427/409; 427/410; 427/407.1; 427/385.5; 427/294
(58) Field of Search ................................. 427/535, 551, 427/558, 559, 255.6, 409, 410, 407.1, 385.5, 294

(56) References Cited

U.S. PATENT DOCUMENTS

| | | | |
|---|---|---|---|
| 3,475,307 A | | 10/1969 | Knox et al. |
| 3,607,365 A | * | 9/1971 | Lindlof |
| 4,098,965 A | * | 7/1978 | Kinsman |
| 4,283,482 A | | 8/1981 | Hattori et al. |
| 4,581,337 A | | 4/1986 | Frey et al. |
| 4,624,867 A | * | 11/1986 | Iijima et al. |
| 4,695,618 A | * | 9/1987 | Mowrer |
| 4,842,893 A | | 6/1989 | Yializis et al. |
| 4,954,371 A | | 9/1990 | Yializis |
| 5,032,461 A | | 7/1991 | Shaw et al. |
| 5,237,439 A | | 8/1993 | Misono et al. |
| 5,260,095 A | * | 11/1993 | Affinito |
| 5,354,497 A | | 10/1994 | Fukuchi et al. |
| 5,395,644 A | | 3/1995 | Affinito |
| 5,427,638 A | | 6/1995 | Goetz et al. |
| 5,440,446 A | | 8/1995 | Shaw et al. |
| 5,536,323 A | | 7/1996 | Kirlin et al. |
| 5,547,508 A | | 8/1996 | Affinito |
| 5,554,220 A | | 9/1996 | Forrest et al. |
| 5,576,101 A | | 11/1996 | Saitoh et al. |
| 5,607,789 A | | 3/1997 | Treger et al. |
| 5,620,524 A | | 4/1997 | Fan et al. |
| 5,629,389 A | | 5/1997 | Roitman et al. |
| 5,654,084 A | | 8/1997 | Egert |
| 5,681,615 A | * | 10/1997 | Affinito et al. |
| 5,681,666 A | | 10/1997 | Treger et al. |
| 5,684,084 A | | 11/1997 | Lewin et al. |
| 5,686,360 A | | 11/1997 | Harvey, III et al. |
| 5,693,956 A | | 12/1997 | Shi et al. |
| 5,711,816 A | | 1/1998 | Kirlin et al. |
| 5,725,909 A | | 3/1998 | Shaw et al. |
| 5,731,661 A | | 3/1998 | So et al. |
| 5,747,182 A | | 5/1998 | Friend et al. |
| 5,757,126 A | | 5/1998 | Harvey, III et al. |
| 5,759,329 A | | 6/1998 | Krause et al. |
| 5,792,550 A | | 8/1998 | Phillips et al. |
| 5,811,177 A | | 9/1998 | Shi et al. |
| 5,811,183 A | | 9/1998 | Shaw et al. |
| 5,821,692 A | | 10/1998 | Rogers et al. |
| 5,844,363 A | | 12/1998 | Gu et al. |
| 5,872,355 A | | 2/1999 | Hueschen |
| 5,902,641 A | | 5/1999 | Affinito et al. |
| 5,902,688 A | | 5/1999 | Antoniadis et al. |
| 5,912,069 A | | 6/1999 | Yializis et al. |
| 5,922,161 A | | 7/1999 | Wu et al. |
| 5,945,174 A | | 8/1999 | Shaw et al. |
| 5,948,552 A | | 9/1999 | Antoniadis et al. |
| 5,965,907 A | | 10/1999 | Huang et al. |
| 5,996,498 A | | 12/1999 | Lewis |
| 6,045,864 A | * | 4/2000 | Lyons et al. |

FOREIGN PATENT DOCUMENTS

| | | |
|---|---|---|
| BE | 704 297 | 2/1968 |
| DE | 19603746 | 4/1997 |
| EP | 0 340 935 | 11/1989 |
| EP | 0 299 753 | 2/1993 |
| EP | 0 547 550 | 6/1993 |
| EP | 0 590 467 | 4/1994 |
| EP | 0 390 540 | 8/1994 |
| EP | 0 722 787 | 7/1996 |
| EP | 0 787 826 | 8/1997 |
| EP | 0 916 394 | 5/1999 |
| EP | 0 931 850 | 7/1999 |
| EP | 0 977 469 | 2/2000 |
| JP | 63136316 | 6/1988 |
| JP | 64-18441 | 1/1989 |
| JP | 2-183230 | 7/1990 |
| JP | 08325713 | 12/1996 |
| JP | 09059763 | 3/1997 |
| WO | 87/07848 | * 12/1987 |
| WO | WO 87 07848 | 12/1987 |
| WO | WO 95 10117 | 4/1995 |
| WO | WO 97 04885 | 2/1997 |
| WO | WO 97 22631 | 6/1997 |
| WO | WO 98 10116 | 3/1998 |
| WO | WO 98 18852 | 5/1998 |
| WO | WO 99 16557 | 4/1999 |
| WO | WO 99 16931 | 4/1999 |

OTHER PUBLICATIONS

Bunshah et al., Deposition Technologies for Films and Coatings, Noyes Publications, Park Ridge, New Jersey, p. 339, 1982 (no month).*
Gustafson et al., Nature, vol. 35, Jun. 11, 1992, pp. 447–479.
Affinito, J.D. et al., Polymer–Oxide Transparent Barrier Layers Produced Using the PML Process, 39th Annual Technical Conference Proceedings of the Society of Vacuum Coaters, Vacuum Web Coating Session, 1996, pp. 392–397 (No Month).

(List continued on next page.)

Primary Examiner—Timothy Meeks
(74) Attorney, Agent, or Firm—Killworth, Gottman, Hagan & Schaeff, LLP

(57) ABSTRACT

The present invention is a method of making a thin film of a polyurethane. The method has the steps of: (a) vacuum coating a thin layer of a solventless mixture of a monomer mixture, said monomer mixture selected from the group consisting of polyols, polyisocyanates and combinations thereof, onto a substrate in a vacuum chamber; and (b) curing the monomer as said thin film of said polyurethane.

21 Claims, 2 Drawing Sheets

OTHER PUBLICATIONS

Affinito, J.D. et al., PML/Oxide/PML Barrier Layer Performance Differences Arising From Use of UV or Electron Beam Polymerization of the PML Layers, Thin Solid Films, vol. 308, pp. 19–25 1997 (No Month).

Affinito, J.D. et al., "Vacuum Deposition of Polymer Electrolytes On Flexible Substrates", "Proceedings of the Ninth International Conference on Vacuum Web Coating", Nov. 1995 ed., R. Bakish Press 1995, pts. 20–36.

Vossen, J.L. et al., Thin Film Processes, Academic press, 1978, Part II, Chapter II–1, Glow Discharge Sputter Deposition, pp. 12–63; Part IV–1 Plasma Deposition of Inorganic Compounds and Chapter IV–2 Glow Discharge Polymerization, pp. 335–397 (No Month).

Penning, F.M. et al., Electrical Discharges in Gasses, Gordon and Breach Science Publishers, 1965, Chapters 5–6, pp. 19–35, and Chapter 8, pp. 41–50 (No Month).

Affinito, J.D. et al., "High Rate Vacuum Deposition of Polymer Electrolytes", Journal Vacuum Science Technology A 14(3), May/Jun. 1996.

Inoue et al., Proc. Jpn. Congr. Mater. Res., vol. 33, 1990, pp. 177–179 (No Month).

Affinito, J.D. et al., Ultrahigh rate, wide area, plasma polymerized films from high molecular weight/low vapor pressure liquid or solid monomer precursors, J. Vac. Sci. Technol. A 17(4), Jul./Aug. 1999, pp. 1974–1981.

Affinito, J.D. et al., Polymer/Polymer, Polymer/Oxide, and Polymer/Metal Vacuum Deposited Interference Filters, Tenth International Vacuum Web Coating Conference, Nov. 1996, pp. 1–14.

Affinito, J.D. et al., Ultra High Rate, Wide Area, Plasma Polymerized Films from High Molecular Weight/Low Vapor Pressure Liquid or Solid Monomer Precursors, 45th International Symposium of the American Vacuum Society, pp. 1–26 (No Date).

Affinito, J.D. et al., Vacuum Deposited Conductive Polymer Films, The Eleventh International Conference on Vacuum Web Coating, pp. 1–12 (No Date).

Shi, M.K. et al., In–situ and real–time monitoring of plasma–induced etching of PET and acrylic films. pp. 1–25 (No Date).

Shi, M.K. et al., Plasma treatment of PET and acrylic coating surfaces: I. In–situ XPS measurements, pp. 1–28 (No Date).

Affinito, J.D. et al., Vacuum deposited polymer/metal multilayer films for optical application, Thin Solid Films 270, 1995, pp. 43–48 (No Date).

Affinito, J.D. et al., Molecularly Doped Polymer Composite Films for Light Emitting Polymer Applications Fabricated by the PML Process, 41st Technical Conference of the Society of Vacuum Coaters, Apr. 1998, pp. 1–6.

Affinito, J.D. et al., A new method for fabricating transparent barrier layers, Thin Solid Films 290–291, 1996, pp. 63–67 (No Month).

Affinito, J.D. et al., Vacuum deposited polymer/metal films for optical applications, pp. 1–14 (No Date).

Affinito, J.D. et al., Vacuum Deposition of Polymer Electrolytes On Flexible Substrates, The Ninth International Conference on Vacuum Web Coating, pp. 1–16 (No Date).

Shaw D.G. et al., Use of Vapor Deposited Acrylate Coatings to Improve the Barrier Properties of Metallized Film, Society of Vacuum Coaters, 37th Annual Technical Conference Processings, 1994, pp. 240–244 (No Month).

PCT International Search Report for International application No. PCT/US00/0335 dated May 7, 2000.

* cited by examiner

METHODS FOR MAKING POLYURETHANES AS THIN FILMS

FIELD OF THE INVENTION

The present invention relates to methods for making polyurethanes as thin films. As used herein, the term "polyurethane(s)" includes both non-acrylated and acrylated polyurethanes as well as any other polyurethane-like polymers. In the art, classical polyurethanes are non-acrylated, and acrylated polyurethanes as well as other modified polyurethanes are considered polyurethane-like materials. For brevity, the term polyurethane(s) encompasses them all.

BACKGROUND OF THE INVENTION

Polyurethanes are commonly used for coatings, adhesives, elastomeric materials, foams, and molding. Many of the mechanical properties of polyurethanes, like flexibility and adhesiveness, make them useful as thin films. As discussed by J. C. Salamone, editor, "Polymeric Materials Encyclopedia", CRC Press, 1996, volume 9, pages 6940–6991, polyurethane materials are typically fabricated at atmospheric pressures via wet chemical processing methods such as reacting bischloroformate with a diamime or by reacting a glycol or alcohol with an isocyanate compound (typically a diol or dialcohol with a diisocyante). Disadvantages of these methods include inapplicability to vacuum deposition of thin films because the reactants are in a solvent (generally aqueous) that would boil upon introduction to a vacuum causing difficulty with the vacuum system and causing undesirable texture f the film. In addition these methods exhibit limited precision for controlled thickness, and limited production throughput. Depending on the specific solvent, catalyst, temperature, isocyanate (or diisocyanate), and alcohol or diol the reaction may proceed spontaneously, and quickly, at room temperature or the reaction may proceed relatively slowly. In most cases there is some degree of spontaneous reaction when the two principle reactants are placed in contact.

Several processes for making thin polymer layers have been developed, especially for electronic devices requiring polymer composite layers for devices including but not limited to molecularly doped polymers (MDP), light emitting polymers (LEP), and light emitting electrochemical cells (LEC). Presently these devices are made by spin coating or physical vapor deposition (PVD). Physical vapor deposition may be either evaporation or sputtering. With spin coating, surface area coverage is limited and scaling up to large surface areas requires multiple parallel units rather than a larger single unit. Moreover, physical vapor deposition processes are susceptible to pin holes.

Methods of liquid monomer spreading include but are not limited to physical or mechanical liquid:monomer spreading apparati, for example roll coaters, gravure roll coaters, wire wound rods, doctor blades and slotted dies. Thin films made by these methods are subject to pin holes and experience difficulties in bonding to additional layers. In U.S. Pat. No. 5,260,095 (herein incorporated by reference) there is described methods for liquid monomer spreading done under a vacuum or in a vacuum chamber, having advantages of avoiding or reducing the need for photoinitiator and also obtaining a smoother finished surface. U.S. Pat. No. 5,395,644 also describes a method of liquid monomer spreading under a vacuum but for the specific purposes of making lithium polymer batteries as well as for making electrochromic devices.

Another method of making thin polymer films is the process of plasma enhanced chemical vapor deposition (PECVD) described in THIN FILM PROCESSES, J. L. Vossen, W. Kern, editors, Academic Press, 1978, Part IV, Chapter IV—1 Plasma Deposition of Inorganic Compounds, Chapter IV—2 Glow Discharge Polymerization, herein incorporated by reference. Briefly, a glow discharge plasma is generated on an electrode that may be smooth or have pointed projections. Traditionally, a gas inlet introduces high vapor pressure monomeric gases into the plasma region wherein radicals are formed so that upon subsequent collisions with the substrate, some of the radicals in the monomers chemically bond or cross link (cure) on the substrate. The high vapor pressure monomeric gases include gases of $CH_4$, $SiH_4$, $C_2H_6$, $C_2H_2$, or gases generated from high vapor pressure liquid, for example styrene (10 torr at 87.4° F. (30.8° C.)), hexan (100 torr at 60.4° F. (15.8° C.)), tetramethyldisiloxane (10 torr at 82.9° F. (28.3° C.) 1,3,-dichlorotetra-methyldisiloxane) and combinations thereof that may be evaporated with mild controlled heating. Because these high vapor pressure monomeric gases do not readily cryocondense at ambient or elevated temperatures, deposition rates are low (a few tenths of micrometer/min maximum) relying on radicals chemically bonding to the surface of interest instead of cryocondensation. Remission due to etching of the surface of interest by the plasma competes with cryocondensation. Lower vapor pressure species have not been used in PECVD because heating the higher molecular weight monomers to a temperature sufficient to vaporize them generally causes a reaction prior to vaporization, or metering of the gas becomes difficult to control, either of which is inoperative.

The basic process of flash evaporation is described in U.S. Pat. No. 4,954,371 herein incorporated by reference. This basic process may also be referred to as polymer multi-layer (PML) flash evaporation. Briefly, a radiation polymerizable and/or cross linkable material is supplied at a temperature below a decomposition temperature and polymerization temperature of the material. The material is atomized to droplets having a droplet size ranging from about 1 to about 50 microns. An ultrasonic atomizer is generally used. The droplets are then flash vaporized, under vacuum, by contact with a heated surface above the boiling point of the material, but below the temperature which would cause pyrolysis. The vapor is cryocondensed on a substrate then radiation polymerized or cross linked as a polymer layer. The material may include a base monomer or mixture thereof, cross-linking agents and/or initiating agents. A disadvantage of the flash evaporation is that it requires two sequential steps, cryocondensation followed by curing or cross linking, that are both spatially and termporally separate.

According to the state of the art of making plasma polymerized films, PECVD and flash evaporation or glow discharge plasma deposition and flash evaporation have not been used in combination. However, plasma treatment of a substrate using glow discharge plasma generator with inorganic compounds has been used in combination with flash evaporation under a low pressure (vacuum) atmosphere as reported in J. D. Affinito, M. E. Gross, C. A. Coronado, and P. M. Martin, AVacuum Deposition Of Polymer Electrolytes On Flexible Substrates. "Paper for Plenary talk in AProceedings of the Ninth International Conference on Vacuum Web Coating", November 1995 ed R. Bakish, Bakish Press 1995, pg 20–36. In that system, the plasma generator is used to etch the surface of a moving substrate in preparation to receive the monomeric gaseous output from the flash evaporation that cryocondenses on the etched surface and is then passed by a first curing station (not shown), for example electron beam or ultra-Violet radiation, to initiate cross linking and curing. The plasma generator has a housing with a gas inlet. The gas may be oxygen, nitrogen, water or an inert gas, for example argon, or combinations thereof. Internally, an electrode that is smooth or having one or more pointed projections produces a glow discharge and makes a plasma with the gas which etches the surface. The flash evaporator has a housing, with a monomer inlet and an atomizing nozzle, for example an ultrasonic atomizer. Flow through the nozzle is atomized into particles or droplets which strike the heated surface whereupon the particles or droplets are flash evaporated into a gas that flows past a series of baffles (optional) to an outlet and cryocondenses on the surface. Although other gas flow distribution arrangements have been used, it has been found that the baffles provide adequate gas flow distribution or uniformity while permitting ease of scaling up to large surfaces. A curing station may be located downstream of the flash evaporator.

All of these deposition methods depend upon use of a monomer mixture (acrylated or non-acrylated) that is not reactive, or does not begin polymerizing prior to deposition.

In spite of these advances, there remains a need for methods that will enable more precise control of thickness of polyurethane films specifically, with increased production throughput.

SUMMARY OF THE INVENTION

The present invention is a method of making a thin film of a polyurethane. The method has the steps of:
(a) vacuum coating a thin layer of a solventless mixture of a monomer mixture, said monomer mixture selected from the group consisting of polyols, polyisocyanates and combinations thereof, onto a substrate in a vacuum chamber; and
(b) curing the monomer as said thin film of said polyurethane.

It is an object of the present invention to provide a method for making thin film of a polyurethane via vacuum coating.

In some instances it may be possible to simply mix the two reactants of polyol and polyisocyanate and run them through the vacuum deposition process exactly as would be done for a non-reactive acrylate monomer as described above. However, in most instances the spontaneous reaction (to form the urethane) would cause polymerization in a degas vessel or the monomer delivery plumbing and quickly clog the delivery system. When spontaneous reaction is a problem, each reactant may be delivered by separate degas/pumping systems to separate ultrasonic atomizers housed in the same vacuum chamber. Because the reactants spontaneously react at room temperature, the higher temperature of the flash evaporation process permits reduction or elimination of the use of catalysts.

It is to be understood that "solventless" means either no solvent or an amount of solvent that is ineffective in altering the reaction.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
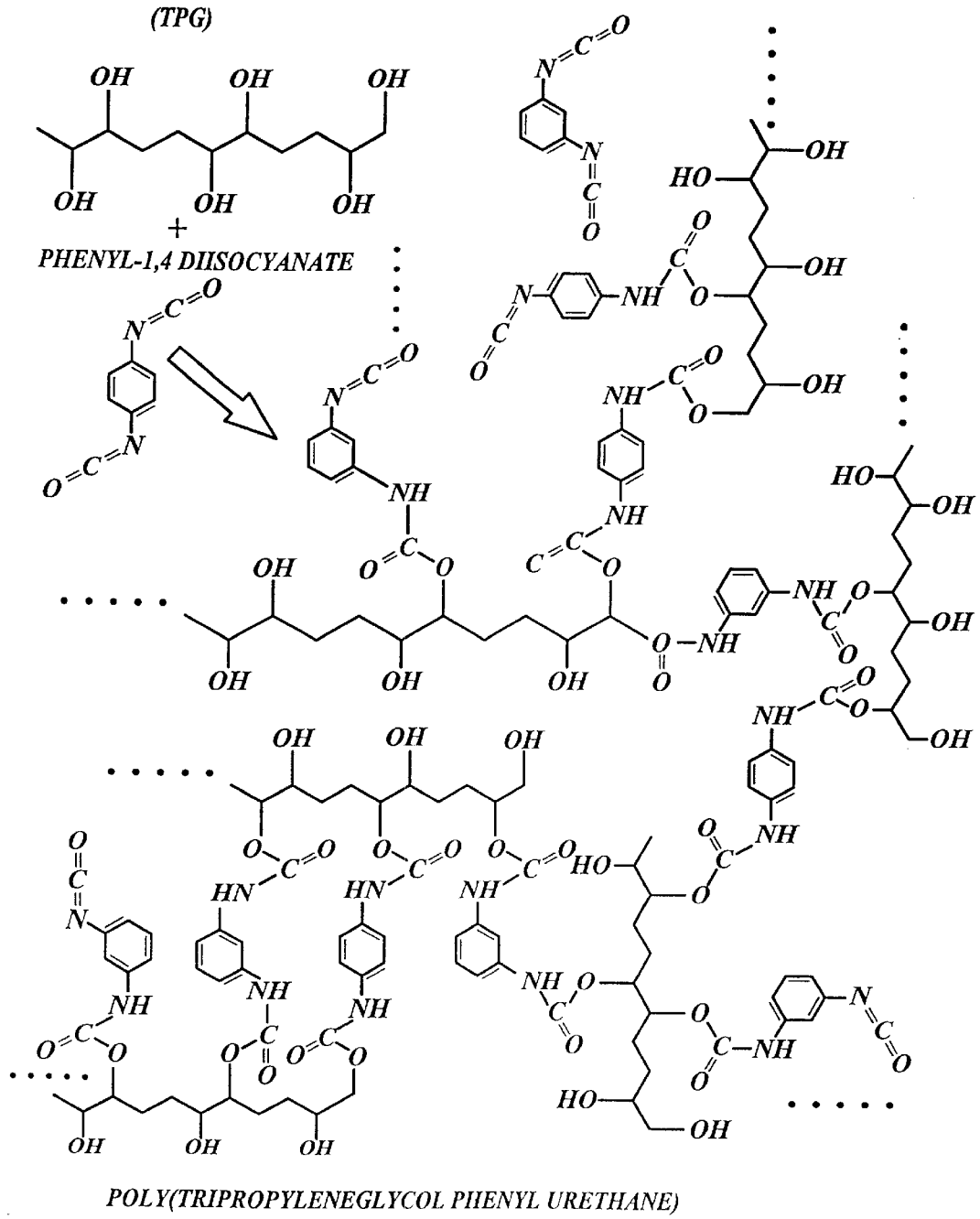
FIG. 1 is a chemical diagram of a reaction pathway of a polyol and a polyisocyanate according to the present invention.

The present invention relates to methods of making a thin film of a polyurethane. A fundamental method of the present invention has the steps of:
(a) vacuum coating a thin layer of a solventless monomer mixture that is a combination of a polyol and a polyisocyanate, onto a substrate in a vacuum chamber; and
(b) curing the monomer as the thin film of said polyurethane.

Many variations of this fundamental method are possible. For example, the fundamental method may be done with a single monomer inlet to a spreader or an evaporator within the vacuum chamber, or with a plurality of monomer inlets to a spreader or an evaporator within the vacuum chamber. When the polyol is kept separate from the polyisocyanate, prior to coating in the vacuum chamber, the combination comes together upon coating. Alternatively, the polyol and polyisocyanate may be mixed as a mixture and the mixture introduced into the vacuum chamber for coating. The choice depends upon the specific combination of polyol and polyisocyanate and the reaction rate. In order to obtain desired characteristics, additional material may be added to the monomer, for example at least one dissolved solid, or insoluble particles, and combinations thereof.

The vacuum coating may be any vacuum coating method including but not limited to flash evaporation, vacuum liquid spreading, and combinations thereof. Flash evaporation is preferred to avoid or reduce the need for a catalyst because of the thermal stimulation of the flash evaporation. When using flash evaporation, several curing methods are available including but not limited to radiation, for example ultraviolet, and/or electron beam; glow discharge ionization; spontaneous thermal induced curing and combinations thereof.

Any polyol may be used including but not limited to glycols, diols, aromatic alcohols 1,4-benzenedimethanol, phenol, hydroquinone, and combinations thereof. As is known in the art of organic chemistry, glycols include but are not limited to ethylene glycol, propylene glycol, diethylene glycol, dipropylene glycol, triethylene glycol, tripropylene glycol, polyethylene glycol, polypropylene glycol and combinations thereof. Further, diols include but are not limited to 1,2-propanediol; 1,4-butanediol; 1,6-hexanediol; cis-1,2-cyclohexanediol; 9,10-dihydroanthracene-9-10-diol; trimethylolpropane-diol, and combinations thereof. Phenols include but are not limited to phenol, methyl phenol, napthol and combinations thereof.

Moreover, the polyol may be acrylated as for example, tripropyleneglycol diacrylate, polyethyleneglycol diacrylate, hexanediol diacrylate and combinations thereof.

Polyisocyanates include but are not limited to aliphatic isocyanates, aromatic isocyanates, and combinations thereof. As is known in the art of organic chemistry, aliphatic isocyanates include but are not limited to hexamethylene monoisocyanate, hexamethylene diisocyanate, isophorene diisocyanate, dimethyl diisocyante, 4,4'-diisocyanato dicyclohexylmethane and combinations thereof. Aromatic isocyanates include but are not limited to phenyl to isocyanate, phenyl-1,3-diisocyanate, phenyl-1,4-diisocyanate, 2,4-toluene-diisocyanate, napthalene-diisocyanate, 4,4-methylene-diphenyl-diisocyanate and combinations thereof.

Figure 2:
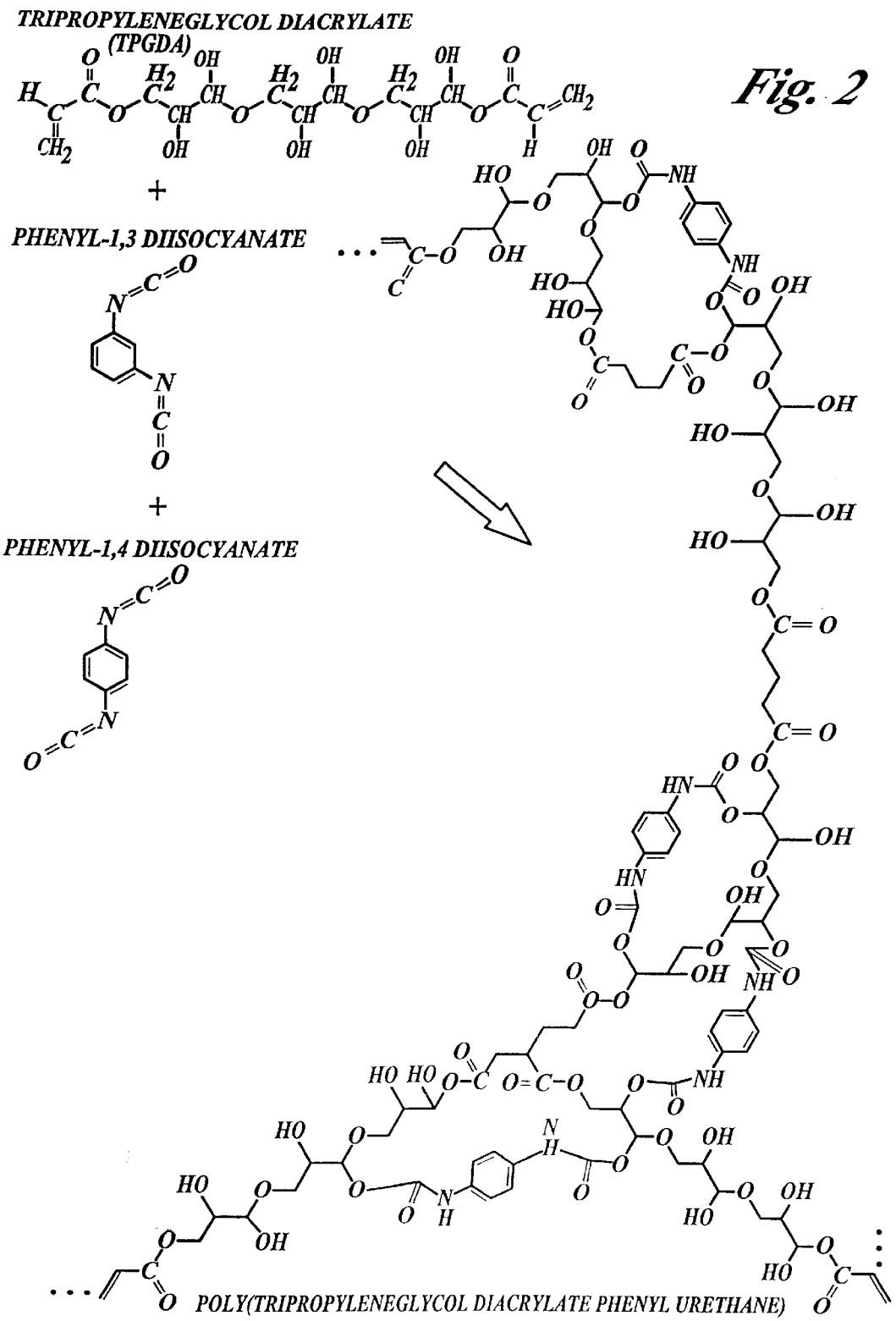
FIG. 2 is a chemical diagram of a reaction pathway of an acrylated polyol and polyIsoeyanates according to the present invention.

The polyurethane includes but is not limited top poly (tripropyleneglycol phenyl urethane), poly (tripropyleneglycol diacrylate phenyl urethane), and combinations thereof. An exemplary reaction pathways for the polyol tripropylene glycol with the polyisocyanate phenyl-1,4-diisocyanate to the poly(tripropyleneglycol phenyl urethane) is shown in FIG. 1. An exemplary reaction pathway for the acrylated polyol tripropyleneglycol diacrylate and the polyisocyanates phenyl-1,3-diisocyanate and phenyl-1,4-diisocyanate is shown in FIG. 2.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope, of the invention.

I claim:

1. A method of making a thin film of a polyurethane comprising:
    (a) flash evaporating a solventless monomer mixture that is a combination of a polyol and a polyisocyanate by contact with a heated surface under vacuum to form a vapor;
    (b) condensing said monomer mixture onto a substrate under vacuum in a vacuum chamber; and
    (c) curing said monomer mixture as said film of said polyurethane.

2. The method as recited in claim 1, wherein said flash evaporating is with a single monomer inlet to an evaporator within the vacuum chamber.

3. The method as recited in claim 1, wherein said flash evaporating is with a plurality of monomer inlets to an evaporator within the vacuum chamber.

4. The method as recited in claim 3, wherein said polyol passes through one inlet and said polyisocyanate passes through another inlet.

5. The method as recited in claim 3, wherein said combination is a mixture of said polyol and said polyisocyanate.

6. The method as recited in claim 1, wherein said curing is selected from the group consisting of radiation curing, glow discharge ionization curing, spontaneous thermal induced curing and combinations thereof.

7. The method as recited in claim 6, wherein said radiation is selected from the group consisting of ultraviolet, electron beam and combinations thereof.

8. The method as recited in claim 1, wherein said monomer mixture contains at least one dissolved solid.

9. The method as recited in claim 1, wherein said monomer mixture contains a plurality of particles insoluble in said monomer mixture.

10. The method as recited in claim 1, wherein said polyol is selected from the group consisting of glycols, diols, aromatic alcohols, 1,4-benzenedimethanol, phenols, hydroquinone, and combinations thereof.

11. The method as recited in claim 10, wherein said glycols are selected from the group consisting of ethylene glycol, propylene glycol, diethylene glycol, dipropylene glycol, triethylene glycol, tripropylene glycol, polyethylene glycol, polypropylene glycol and combinations thereof.

12. The method as recited in claim 10, wherein said diols are selected from the group consisting of 1,2-propanediol; 1,4-butanediol; 1,6-hexanediol; cis-1,2-cyclohexanediol; 9,10-dihydroanthracene-9-10-diol; trimethylolpropane-diol, and combinations thereof.

13. The method as recited in claim 10, wherein said phenols are selected from the group consisting of phenol, methyl phenol, napthol, and combinations thereof.

14. The method as recited in claim 1, wherein said polyol is an acrylated polyol.

15. The method as recited in claim 14, wherein said acrylated polyol is selected from the group consisting of tripropyleneglycol diacrylate, polyethyleneglycol diacrylate, hexanediol diacrylate and combinations thereof.

16. The method as recited in claim 1, wherein said polyisocyanate is selected from the group consisting of aliphatic isocyanates, aromatic isocyanates, and combinations thereof.

17. The method as recited in claim 16, wherein said aliphatic isocyanates are selected from the group consisting of hexamethylene monoisocyanate, hexamethylene diisocyanate, isophorene diisocyanate, dimethyl diisocyanate, 4,4'-diisocyanato dicyclohexylmethane and combinations thereof.

18. The method as recited in claim 16, wherein said aromatic isocyanates are selected from the group consisting of phenyl isocyanate, phenyl-1,3-diisocyanate, phenyl-1,4-diisocyanate, 2,4-toluene-diisocyanate, napthalene-diisocyanate, 4,4-methylene-diphenyl-diisocyanate and combinations thereof.

19. The method as recited in claim 1, wherein said polyurethane is selected from the group consisting of poly (tripropyleneglycol phenyl urethane), poly (tripropyleneglycol diacrylate phenyl urethane), and combinations thereof.

20. The method as recited in claim 1, wherein flash evaporating comprises:
    (a) supplying a continuous liquid flow of the monomer mixture into a vacuum environment at a temperature below both the decomposition temperature and the polymerization temperature of the monomer mixture;
    (b) continuously atomizing the monomer mixture into a continuous flow of droplets;
    (c) continuously vaporizing the droplets by continuously contacting the droplets on a heated surface having a temperature at or above a boiling point of the liquid monomer mixture, but below the pyrolysis temperature, forming a composite vapor.

21. A method of making a thin film of a polyurethane comprising:
    (a) flash evaporating a polyol and a polyisocyanate by contact with a heated surface under vacuum to form a vapor;
    (b) condensing the vapor onto a substrate under vacuum to form a condensed layer; and
    (c) curing the condensed layer as the film of the polyurethane.

* * * * *

UNITED STATES PATENT AND TRADEMARK OFFICE
CERTIFICATE OF CORRECTION

PATENT NO. : 6,506,461 B2
DATED : January 14, 2003
INVENTOR(S) : John D. Affinito It is certified that error appears in the above-identified patent and that said Letters Patent is hereby corrected as shown below:

Column 1,
Line 32, "undesirable texture f the film." should be -- undesirable surface texture of the film. --
Line 54, "liquid:monomer" should be -- liquid monomer --
Line 59, "there is described" should be -- there are described --

Column 2,
Line 51, "termporally separate." should be -- temporally separate. --
Line 60, "A Vacuum Deposition" should be -- A Vacuum Deposition --
Line 61, "talk in AProceedings" should be -- talk in A Proceedings --

Column 4,
Line 2, "polylsoeyanates" should be -- polyisocyanates --
Line 64, "phenyl to isocyanate," should be -- phenyl isocyanate, --

Column 5,
Line 1, "limited top poly" should be -- limited to poly --
Line 19, "scope, of" should be -- scope of --

Signed and Sealed this

Eighth Day of July, 2003

JAMES E. ROGAN
*Director of the United States Patent and Trademark Office*